United States Patent
Jacob

[15] 3,705,958
[45] Dec. 12, 1972

[54] PATH TESTING DEVICE FOR TIME CHANNEL CONNECTION NETWORK

[72] Inventor: Jean-Baptiste Jacob, Saint Quay Perros, France

[73] Assignee: C.I.T. Compagnie Industrielle Des Telecommunication, Paris; Lannionnaise D'Electronique, Lannion, both of France

[22] Filed: Nov. 17, 1970

[21] Appl. No.: 90,285

[30] Foreign Application Priority Data

Nov. 17, 1969 France ......................6939464

[52] U.S. Cl. ..............................179/18 J, 179/15 AT
[51] Int. Cl. .............................................H04q 11/04
[58] Field of Search..179/18 ES, 18 EA, 18 FC, 18 J, 179/18 GF, 15 AT

[56] References Cited

UNITED STATES PATENTS 3,462,743 8/1969 Milewski ............179/18 ES X
3,158,689 11/1964 Masure ..................179/15 AT
3,524,946 8/1970 Pinet et al. ................179/18 J

*Primary Examiner*—Kathleen H. Claffy
*Assistant Examiner*—Thomas W. Brown
*Attorney*—Donald R. Antonelli and Paul M. Craig, Jr.

[57] ABSTRACT

A path testing device for a time channel connection network employs a decision and control network which, through its permanent connection with a central processing computer, delivers control signals to various elements connected with the central memory for selecting and storing an available time channel on one of a plurality of time division multiplex communication paths possible through an intermediate stage of a multiple stage interconnection time channel switching network. The path testing device is responsive to an incoming time slot and an outgoing time slot being accessed to and from the input stage and sequentially examines available time slots from a number available within the intermediate time switching stage.

8 Claims, 7 Drawing Figures

FIG. 4
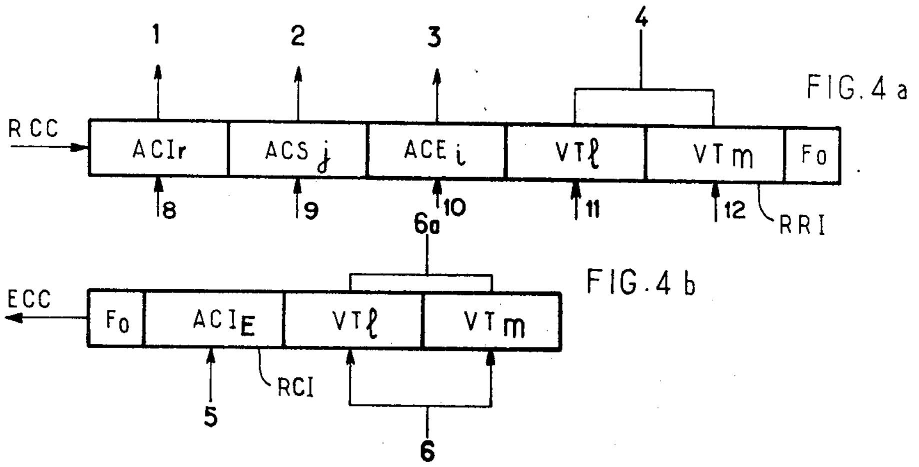
FIG. 4a, FIG. 4b
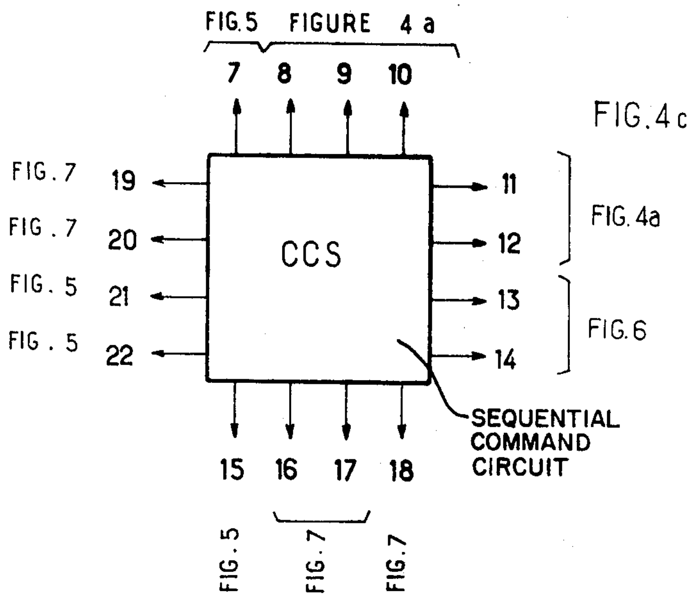
FIG. 4c

PATH TESTING DEVICE FOR TIME CHANNEL CONNECTION NETWORK

BACKGROUND OF THE INVENTION

Patent application, Ser. No. 50,692 dated June 29, 1970 describes a time channel connection circuitry for an automatic switching system. The connection circuitry includes an input stage, an intermediate stage, and an output stage. With reference to FIG. 1, the input stage consists of $n$ time switches CE1 to CE$n$ each with $n$ inputs and $(2n - 1)$ outputs; the intermediate stage includes $(2n - 1)$ intermediate time switches CI1 to CI $(2n - 1)$ each with $n$ inputs and $n$ outputs; and the output stage, like the input stage, includes $n$ time switches CS1 to CS$n$, each time switch having $(2n - 1)$ inputs and $n$ outputs. Each of the $(2n - 1)$ outputs of an input time switch such as switch CE1 is connected by a loop to one entry of each of the $(2n - 1)$ intermediate time switches and, in a similar manner, each of the $(2n - 1)$ inputs of an output time switch, for example, CS1, is connected by a loop to an output of each of the $(2n - 1)$ intermediate time switches.

It was also seen in this patent application that each input, intermediate, or output commutator has a similar internal structure. For example, in the particular case where all of the time switches are square and of the same type each of the input time switches includes 32 incoming network lines LRE1 to LRE32, coupled to 32 input registers REE1 to REE32. A buffer memory MTE1 is made up of 32 elementary blocks or memories, each including 32 words of eight bits each. A command memory MCE1 includes 1,024 words, like the buffer memory, but each word in the command memory is comprised of 10 bits. These 1,024 words also constitute 32 blocks of 32 words. With each block there is associated an output register RSE1 to RSE32 and from each output register starts an intermediate network line LREI1 to LREI32, toward the input registers of the intermediate time switches.

In said patent application it was seen furthermore that, in order to establish a connection between an input time switch and an output time switch, it was necessary to find an intermediate time switch having a free time channel on the intermediate incoming network line connecting it to the input time switch, as well as a free time channel on the intermediate outgoing network line connecting it to the output time switch. To make this search for a free path, a central memory is used to store the states of occupation of the intermediate network lines. The memory has a capacity of $2n$ 32 bit words for each intermediate time switch.

SUMMARY OF THE INVENTION

This invention concerns the structure of the central memory which stores the states of the channels in the intermediate stage and, its associated logic. By the state of a channel is meant whether or not it is occupied.

The invention provides a path testing device, including a central occupation states memory, for determining a free path between two points in a time channel connection network with stages, characterized by the fact that said central occupation states memory includes logical decision and command circuitry which, through a permanent connection with a central computer, sequentially orders and commands the different members of the central memory, to determine the first free path.

According to one feature of the invention, the central memory and its associated logic network includes several portions:

A block of logic decision and command circuitry,

An address register which handles the addressing of the time switches to be connected, An address decoder whose purpose is to translate the binary address into the decimal system, A memory block of $2(m \times n)$ 32 bit words which corresponds to the m intermediate selector switches, with n incoming or outgoing intermediate network lines, or $2\ (32 \times 32) = 2{,}048$ words of 32 bits in the particular case of the network with 32 selector switches with 32 network lines, A reading and writing register associated with the memory, A circuit for the selection of a free time channel and for the coding, in the binary system, of the decimal rank of the free time channel intervening during the taking of a time channel, A decoding and positioning circuit makes it possible, by means of a time or temporal channel register of five bits, to position, at 1 or at 0, anyone of the 32 bits which are in the reading and writing register of the memory intervening during the release of a time channel.

The central memory is used to speed up a path search, which is indispensable in large-capacity networks and, also, to permit, by simply reading the occupation memory, a knowledge, at any instant, of the state of occupation of the channels and, to avoid the use of high-speed electronic connections with a large number of interconnections between the outputs of the command memories of all of the selector switches and a zero test circuit in a command memory word, a circuit which could constitute a possible path testing circuit.

The central memory and its associated logic network intervenes also in the path test for the establishment of a communication as well as for the release of the occupied path at the end of the communication.

In the first case, the input selector switch CE$i$ and the output time switch CS$j$ are known. An intermediate time switch CI$k$ having a free time channel (VT$l$) on the incoming network line (LREI$i$) and a free time channel (VT$m$) on the outgoing network line (LRS$j$) must be found. The path test consists of, in succession, performing this operation on all of the intermediate time switches, starting with the first one.

In the second case, the number of the intermediate time switch CI$k$ and the numbers of the network lines LREI$i$ and LRSI$j$ and the time channels VT$l$ and VT$m$ used for the path are all known. We first of all proceed to erase, in the command memories of the connection network all the information therein and then proceed to erase in the central memory the time channels VT$l$ and VT$m$, corresponding to the intermediate network lines.

According to another feature of the invention, the decision and command logic block is itself made up of several portions:

A reception register for information coming from the central computer;

A register for transmission of information to the central computer;

A sequential command circuit for controlling the logic operations for the path test and for the path release.

According to the invention, in a path test or in path release, a command circuit issues a sequential command of the logic operations suitable for each of the two cases;

In the path test, the sequential command resumes for each intermediate time switch explored; if no intermediate time switch is available, the occupation is given to the caller; in path release, a first sequential command proceeds to the release of the time channel of the intermediate incoming network line and a second sequential command proceeds to the release of the time channel of the outgoing intermediate network line.

According to another feature of the invention, the path search process essentially consists — if we know what the incoming and outgoing intermediate network lines are — in determining an intermediate time switch which has a free time channel on the incoming intermediate network line, and then retaining said intermediate time switch, determining if there exists a free time channel on the outgoing intermediate network line and, knowing then the two intermediate network lines and the two corresponding incoming and outgoing time channels, in writing them in the central memory as new occupation states of these two intermediate network lines, before informing the central computer as to the positive path test and the elements determining it.

According to another feature of the invention, the process of path release essentially consists — if we know the number of the intermediate time switch used, the numbers of the incoming and outgoing intermediate network lines and the numbers of the corresponding time channels VT*l* and VT*m*, of the moment the path has been cleared in the connection network due to the erasing of the words of the outgoing, intermediate, and incoming command memories, proceeding to erase the corresponding occupation memory words.

According to yet another feature of the invention, after the transfer of the number of the time channel of the outgoing intermediate network line into a register of time channels and after the reading of the word of said intermediate network line figure in the occupation memory, we erase the number of the time channel and we re-enter once again the word thus obtained in the central memory; we proceed in a similar manner to erase the time channel of the incoming intermediate network line, taking care to retain the same intermediate time switch number.

BRIEF DESCRIPTION OF THE DRAWINGS

FIG. 4, consisting of FIGS. 4*a*, 4*b* and 4*c*, shows a decision and command logic diagram according to the invention;

DETAILED DESCRIPTION OF THE PREFERRED EMBODIMENT

Figure 1:
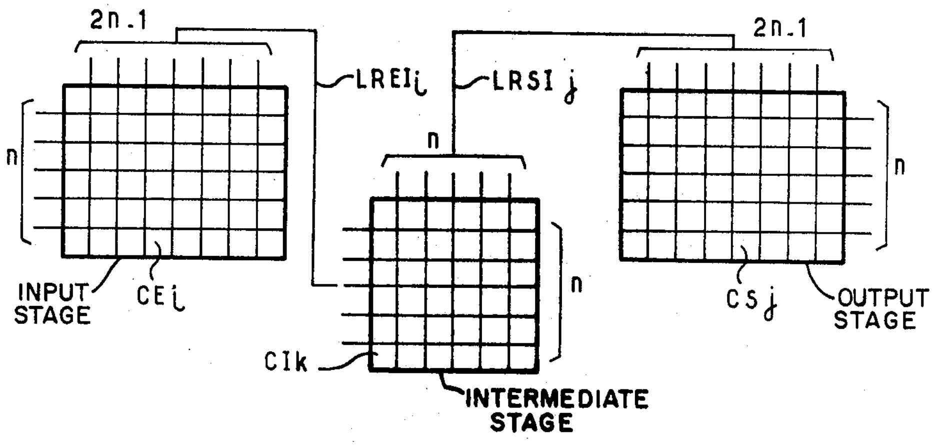
FIG. 1 shows a connection network, as described in patent application, Ser. No. 50,692, June 29, 1970.
Figure 2:
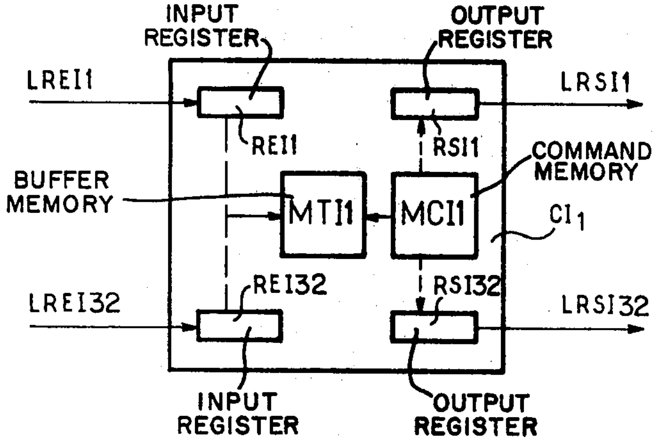
FIG. 2 represents the internal structure, as described in patent application, Ser. No. 50,692, June 29, 1970, of an intermediate time switch.

FIGS. 1 and 2 are given for the better understanding of the text.

FIG. 1 represents the structure of a time connection network of the type described in FIG. 1 of patent application, Ser. No. 50,692, dated June 29, 1970. In such a structure, each input time switch CEI includes $n$ inputs and $2n-1$ outputs, each intermediate time switch CI*k* includes $n$ inputs and $n$ outputs and each output time switch CS*j* includes $2n-1$ inputs and n outputs.

In the case in FIG. 1, the intermediate time switch CI*k* is connected to the input time switch CE*i* by an intermediate incoming network line LREI*i* and to the output time switch CS*j* by an intermediate outgoing network line LRSI*j*.

In the path test, that is a test for determining a free channel associated with an intermediate input line and a free channel associated with an intermediate output line we know the party inquiring and the party being questioned and we consequently know the time switches CE*i* and CS*j* to which they are connected; the problem thus is to find an intermediate time switch CI*k* having a free time channel on the incoming network line LREI*i* and a free time line on the outgoing network LRSI*j*. The path test consists in conducting this operation successively on all of the intermediate time switches, starting with the first one, which is CI1.

FIG. 2 illustrates the basic diagram of an intermediate time switch CI1, as described in FIG. 2 of patent application, Ser. No. 50,692, June 29, 1970, wherein, at each stage, there are 32 time switches with 32 network lines; the latter includes 32 input registers REI1 to REI32, with each input register being connected to a different input time switch by a network line, such as LREI*i*, and 32 output registers RSI1 to RSI32, each output register being connected to a different output time switch by a network line such as LRSI*j*. Furthermore, associated with the 32 input registers we have a buffer memory MTI1 and associated with the 32 output registers there is a command memory MCI1. The buffer memory consists of 32 elementary memories (one for each network line), each including 32 words (one per time channel), each word being made up of several bits. The same arrangement is used in the command memory MCI1.

The detailed description which follows is given in relation to a network which comprises 32 time switches with 32 network lines at each one of the three stages.

Figure 3:
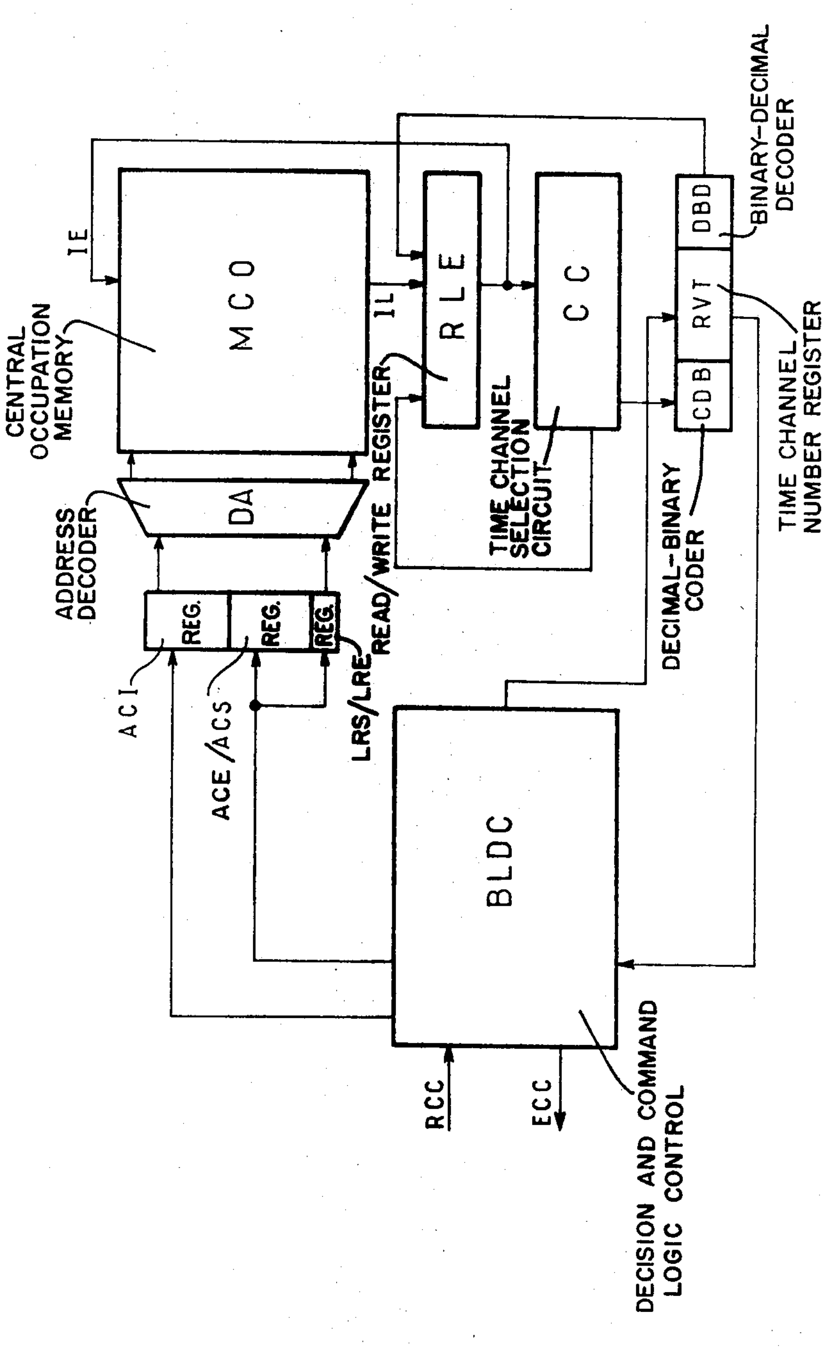
FIG. 3 shows a basic diagram of a central memory and the associated logic connections of the path testing device according to the present invention.

FIG. 3 shows a functional diagram of the central memory of this invention and its associated logic. The memory and its logic includes:

A block BLDC for decision and command logic control;

A group of memory word addressing registers, including:

a. Five bit register ACI for storing the address of an intermediate time switch.

b. A five bit register ACE/ACS for selectively storing the address of an input or output time switch which is to be connected, through an intermediate switch to an output or input switch respectively, c. A single stage register LRS/LRE for indicating whether we are dealing with a network line entering into the intermediate time switch (LREI) or coming out of the intermediate time switch (LRSI);

An address decoder DA whose purpose it is to give, in the decimal system, the number of the intermediate time switch and the number of the intermediate incoming network line received, in the binary system;

A central occupation memory MCO with a capacity of 2,048, 32 bit words (2 times 32 network lines (LREI and LRSI) per intermediate time switch and 32 intermediate time switches);

A reading/writing register RLE, associated to the memory MCO;

A time channel selection circuit CC for indicating the first free bit, corresponding to the first free channel, in the register RLE;

A time channel number register RVT, associated with a decimal-binary coder CDB and a binary-decimal decoder DBD.

The information coming from the central computer is received by the RCC connections and the information sent on toward the central computer is transmitted through the ECC connections.

The connections between the memory MCO and the register RLE are provided by 32 read information wires IL and by 32 write information wires IE.

The other connections will be detailed during the description of the following FIGS. 4–7 and, in particular, during the description of FIG. 4*c*.

FIG. 4 illustrates the decision and command logic block diagram designated with the reference symbol BLDC in the preceding FIG. 3. This member includes three parts:

In FIG. 4*a*, we find an assembly of information reception registers RRI for receiving information from the central control computer of the time telephone exchange. One of these registers, register FO, has two bits, indicating the function to be performed, that is to say, the assembly of registers RRI of either a path test or the erasing of a binary path occupation element in the case of release. In this last case, the BLDC block receives:

The number of the intermediate time switch ACI*r*,

The number of the output time switch ACS*j*, which determines the number of the outgoing network line LRSI*j* of the intermediate time switch, The number of the input time switch ACE*i* which determines the number of the incoming network line LREI*i* of the intermediate time switch, The time channel number VT*l* of the incoming network line LREI*i*, The time channel number VT*m* of the outgoing network line LRSI*j*.

In the case of a path test, the assembly of registers RRI of the BLDC block receives only:

The function FO, the number of the output time switch ACS*j*, and the number of the input selector switch ACE*i*, The path test here consisting in the determination of the ACI number and the numbers VT*l* and VT*m*.

The reference wire 1 is the ACI number in the form of a five bit word and is connected to the register ACI in FIG. 3. The reference wire 2 or 3 designates the number of the ACS*j* or of the ACE*i* by a five bit word and is connected to the ACE/ACS register of FIG. 3. The reference wire 4, for VT*l* and VT*m*, each corresponding to five bits designates one time channel out of 32 and is connected to the register RVT in FIG. 7. The incoming information arrives from the central command computer through wire RCC.

FIG. 4*b* illustrates the construction of information transmission register assembly RCI which is used following a path test. An $ACI_E$ register receives the intermediate time switch number which has been determined and the time channel numbers VT*l* and VT*m* on the network lines LREI*i* and LRSI*j* of this intermediate time switch. The reference wire 5 which corresponds to five wires carrying five bits designates the intermediate time switch and comes from the register ACI in FIG. 5. The reference wire 6 pertaining to VT*l* and VI*m* designates one time channel out of 32 (5 binary elements) and come from the register RVT of FIG. 7.

Figure 5:
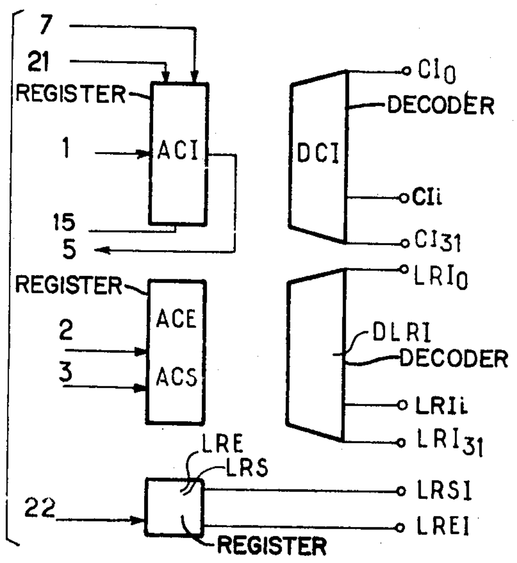
FIG. 5 shows, according to the invention, an assembly of registers permitting the addressing of a coded word of 32 bits, a binary-decimal decoder being associated with each register.
Figure 6:
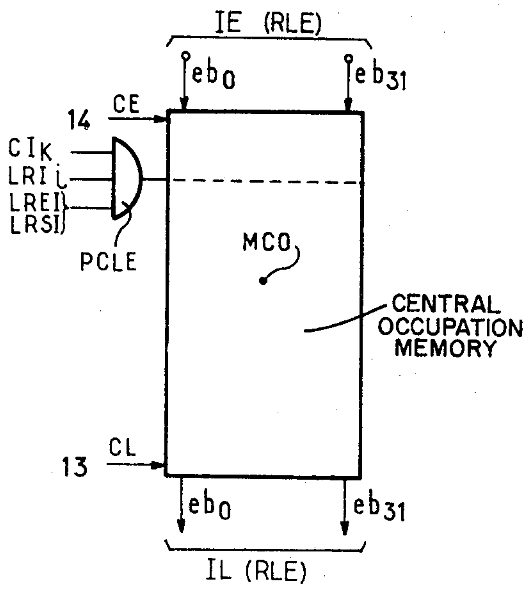
FIG. 6 shows the central memory according to the present invention.
Figure 7:
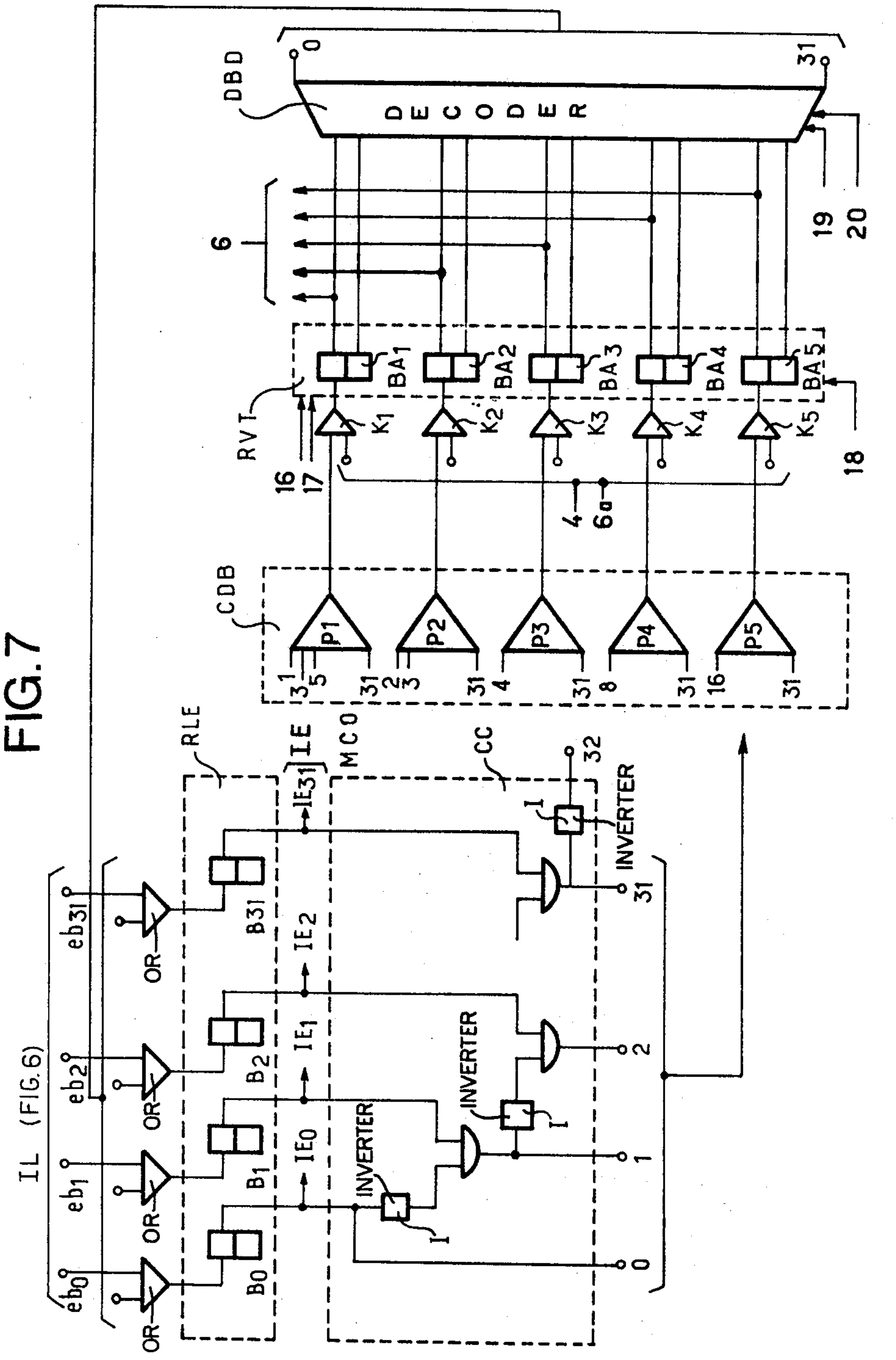
FIG. 7 shows a reading/writing register, a selection circuit, and a time channel register according to the invention.

In FIG. 4*c*, we find a sequential command circuit CCS for controlling the logic operations for the path test and the path release. In the case of a path test, the sequential circuit sets at zero a counting register ACI in FIG. 5, transfers the content of ACS*j* or ACE*i of the reception register RRI* (*FIG. 4 a*) into an ACS/ACE register in FIG. 5. It also performs all of the operations which will be detailed subsequently in the course of operation:

The reference wire No. 7 gives the command to advance for the register ACI in FIG. 5;

The reference wire No. 8 gives the command to transfer the contents of the ACIR (reception) register of FIG. 4*a* into the register ACI of FIG. 5;

The reference wire No. 9 gives the command to transfer the contents of the ACS*j* register of FIG. **4*a* into the ACE/ACS register of FIG. 5**;

The reference wire No. 10 gives the command to transfer the contents of the ACE*i* register of FIG. **4*a* into the ACE/ACS register of FIG. 5; aThe reference wire No. 11 gives the order to transfer the contents of VT1 (FIG. 42) into the register RVT of FIG. 7**;

The reference wire No. 12 gives the order to transfer the contents of VT*m* (FIG. **4*a*) into the register RVT of FIG. 7**;

The reference wire No. 13 gives the command to write in the central memory FIG. 6;

The reference wire No. 14 gives the command for reading from the central memory FIG. 6;

The reference wire No. 15 gives the command for transferring the contents of the counting register ACI, FIG. 5, into the ACI (transmission) register, FIG. **4*b*;**

The reference wire No. 16 gives the command for the transfer of the contents of the RVT register (FIG. 7) into the VT*l* (transmission) register, FIG. **4*b*;**

The reference wire No. 17 gives the command for the transfer of the contents of the RVT register (FIG. 7) into the VT*m* (transmission) register, FIG. **4*b*;**

The reference wire No. 18 gives the command for the transfer of the decimal-binary coder outputs into the register RVT (FIG 7);

The reference wire No. 19 gives the command for the inscription of the "0" in the binary-decimal number decoder coupled to RVT (FIG. 7);

The reference wire No. 20 gives the command for the inscription of "1" in the binary-decimal number decoder coupled to RVT (FIG. 7);

The reference wire No. 21 gives the command for the "0" setting of ACI (FIG. 5);

The reference wire No. 22 gives the "0" setting or the "1" setting for the selection of LRE or LRS (FIG. 5).

FIG. 5 shows in greater detail the portion of FIG. 3 pertaining to the address registers of the central occupation memory with the binary-decimal decoding. The ACI register (address of intermediate time switch), which can receive information in parallel (five wires), reference 1, coming from the reception register RRI, FIG. 4*a*, in the case of path release; in the case of a path test, the ACI register can function as a counting register, permitting us to count in the binary system from 0 to 31, under the advance command of the sequential circuit according to FIG. 4*c*, given by reference wire No. 7.

The ACE/ACS (address of input time switch or output time switch) register, can receive an information item in parallel (five wires), reference 2 or 3, coming from the reception register RRI, FIG. 4*a*, either from ACS*j* or from ACE*i*, depending upon whether we must test a free time channel on an outgoing line LRSI*j* or on an incoming line LREI*i*.

The LRE/LRS register, made up of a single trigger pair, i.e. a flip-flop, which, in the "0" position, indicates that we are dealing with a word of the occupation states of a line LREI and which, in the position "1" , indicates that we are dealing with a word of the occupation states of an LRSI line. This register is placed in the 0 state or in the 1 state by the sequential circuit CCS, FIG. 4*c*. To the register ACI there is associated a binary-decimal decoder DCI which translates the number of the intermediate time switch into the decimal system. To the ACS/ACE register there is associated a binary-decimal decoder DLRI which translates the number of the intermediate network line into the decimal system. Each one of these decoders has 32 outputs $CI_0$ to $CI_{31}$ for the DCI decoder and $LRI_0$ to $LRI_{31}$ for the DLRI decoder.

FIG. 6 more particularly represents the central occupation memory MCO. To each 32 bit word of the memory MCO there is associated an AND gate PCLE with three inputs for the command to read or write the information contained in this word. This information appears at the output of the memory on the 32 information wires $EB_0$ $EB_{31}$, in order to be transferred into the reading/writing register RIE (wires IL, FIG. 3). The three inputs of these command gates PCLE are made up of:

a. The output of the decoder associated with the ACI register giving the intermediate selector switch CI*k;* b. The output of the decoder associated with the ACE/ACS register, giving the intermediate network line LRI*i;* c. The output telling us whether we are dealing with an LRSI or LREI line, which is sufficient to determine a precise word in the memory.

With the decoders associated with the ACI register and the ACS/ACE register, each having 32 outputs, and with the register indicating whether we are dealing with an incoming or outgoing network line LREI or LRSI having two outputs, the assembly of combinations thus leads to: 32 × 32 × 2 = 2,048 gates with three reading or writing inputs in the central memory of the occupation states.

The central occupation memory MCO thus contains 2,048 words of 32 bits each; it has, at the output 32 information read wires and, at the input it has 32 information wires for writing into the memory. The read information wires IL constitute the inputs of the reading/writing register and the to-be-written information wires constitute the outputs of the reading/writing register (see RLE, FIG. 3).

The reading and writing operations take place through the same gate with three address inputs and through a general command, either for reading or for writing. This method of reading or writing is used either in the time memories with ferrite cores, or in the time memories comprised of MOS type semi-conductors. The general reading command wire CL (reference 13) comes from the sequential command circuit in FIG. 4*c;* the same thing happens in the case of the general writing command wire CE (reference 14).

FIG. 7 more particularly shows the reading and writing register RLE, the selection circuit CC, the temporary channel register RVT with the decimal-binary coder CDB and the binary-decimal decoder DBD which are associated with it.

The reading-writing register RLE includes 32 flip-flops BO, B1 . . . B31; each one of these flip-flops can be set with the help of an OR gate either from the read-information wire IL in the occupation memory MCO (FIG. 6) —and, in this case, the 32 flip-flops are set simultaneously— or from a command coming from the binary-decimal decoder DBD for the number of the time channel of the same FIG. 7. In this latter case, the command is individual, that is to say, we position only one flip-flop, which is designated by DBD; the flip-flop is set at "1" or at "0" depending upon whether we want to mark the occupation or the release of a time channel.

The selection circuit CC includes 32 inputs (which are the 32 outputs of the RLE register) and 33 outputs; the outputs 0 to 31 indicate the number of the first free time channel starting from the left with the output 32 indicating that no time channel is free on the intermediate network line being tested. The selection circuit CC thus is intended to indicate the first free time channel of a line being tested. This selection circuit consists of a network of "AND" gates and of cascade connected inverters "I," the output 0 indicating that the binary element 0 is at zero, hence, that the time channel VTO is free, while the output 1 indicates that the binary element 0 is at "1" and that the binary element 1 is at zero, hence, that the time channel VT*l* is free and so forth and so on until the output 31 which indicates that all of the time channels from VTO TO VT30 are occupied but that VT31 is free, while output 32 indicates, as we said earlier, that all of the time channels are occupied.

The writing wires IE1, IE2, IE3, . . . IE31 are shunted to the outputs of the reading and writing register RLE and constitute the IE wires for writing in the memory MCO of the occupation states.

The decimal-binary coding circuit CDB is made up of five "OR" gates, P1 to P5. It enables us to code, in a binary system, a decimal number between 0 and 31. The inputs of the "OR" gates are made up of outputs of the selection circuit CC for the free time channel; we make up a coding network in the following manner, shunting to the outputs 0 to 31:

For gate P1: outputs 1, 3, 5, 7, 9, 11, 13, 15, 17, 19, 21, 23, 25, 27, 29, 31;

For gate P2: outputs 2, 3, 6, 7, 10, 11, 14, 15, 18, 19, 22, 23, 26, 27, 30, 31;

For gate P3: outputs 4, 5, 6, 7, 12, 13, 14, 15, 20, 21, 22, 23, 28, 29, 30, 21;

For gate P4: outputs 8, 9, 10, 11, 12, 13, 14, 15, 24, 25, 26, 27, 28, 29, 30, 31;

For gate P5: outputs 16, 17, 18, 19, 20, 21, 22, 23, 24, 25, 26, 27, 28, 29, 30, 31.

Each of the five gates give us the state 0 or 1 at the output; we thus get, at the output, a binary number of five binary elements, giving us the binary number of a free time channel.

The register RVT for the time channel is made up of five flip-flops BA1, BA2 . . . BA5. It receives its information either from the five "OR" gates P1 to P5 of the decimal-binary coding circuit CDB, or from the VT*l* or VT*m* registers that are part of the information reception register RRI (see FIG. 4*a*); in this latter case, it is the reference wire 4 which provides the connection between RRI and RBT. The inputs of the five "OR" gates numbered from K1 to K5. The RVT outputs, while constituting the inputs of the binary-decimal decoder DBD, have shunts constituting the reference wires 6; these wires constitute the inputs of the registers VT*l* and VT*m* of the information transmission register RCI (see FIG. 4*b*).

The binary-decimal decoder DBD, associated with the RVT register has its outputs from 0 to 31 which constitute inputs of the reading/writing register RLE of the same FIG. 7. The purpose of this decoder is to designate the flip-flop of the RLE register to be positioned at "0" or at "1" prior to the inscription of the entire word of 32 bits in the central occupation memory MCO through the IE wires. This command to write "0" or at "1" comes from the sequential command circuit CCS (FIG. 4*c*); the reference wire 19 gives the "0" entry command and the reference wire 20 gives the "1" entry command.

Operation during path test.

We will now describe the operation in the case of a path test; this information is given by the central computer in the FO register of FIG. 4*a*.

The decision and command logic block BLDC also receives from the central computer the number of the output time switch ACS*j* and the number of the input time switch ACE*i* (FIG. 4*a*); the path test consists in determining the number of the intermediate time switch ACI and the numbers of VT*l* and VT*m*.

The overall operation is as follows (FIG. 1 and 3):

At the beginning of the test, the decision and command logic block (BLDC) enters the value "0" in the portion ACI of the address register of the central occupation memory MCO and, for the purpose of reading the MCO word corresponding to the LREI*i* line, it enters the number "*i*" in the ACE portion of the address register and it writes "0" (for example) in the binary element corresponding to the third portion of the address register, indicating that we are dealing here with an incoming network line LREI.

The number *i* is thus determined by the number of the input time switch to be linked to an intermediate time switch and the number *j* is determined by the number of the output time switch to be connected to an intermediate time switch. The direct relationship between the number *i* of the input time switch and the number *i* of the incoming network line LREI*i*, as well as between the number *j* of the output time switch and the number *j* of the outgoing network line LRSI*j* is due to the structure of the connection network and it is also due to the law of establishment of connections between the intermediate time switches and the input and output time switches, as described in the previously mentioned patent application.

If the network line LRSI*j* of the intermediate time switch CI1 contains a free time channel, the command logic BLDC enters the number *j* in the ACS portion of the address register and enters at "1" the LRE/LRS stage to indicate that this is a test of an LRSI line, after having transferred, into a buffer register of the logic block BLDC, the number of the time channel coded in the register RVT, this number to be *l*.

If the line LRSI*j* of the time switch CI1 contains a free time channel, the logic BLDC transfers the new content of the register RVT into a buffer register and this number would be *m;* the path test ends after we have positioned at "1" the bit locations in the central memory corresponding to the time channels taken. This operation is controlled by the logic of BLDC through the transfer of the numbers *l* and then *m* of the time channels to be marked "occupied" in the RVT register which excites the decoder, permitting us to position at "1" the bit position whose binary-coded number is found in RVT.

If the logic of BLDC does not find a free time channel, either on LREI*i*, or on LRSI*j* of the time switch CI1, it commands the advance of the ACI register which will then contain the number *l* corresponding to the address of the intermediate time switch C12 and the preceding process begins all over again with the entry of the number *i* in ACE and of "0" in the LRE/LRS stage, followed by the inscription of number *j* in ACS and of "1" in the LRE/LRS stage.

So long as we do not find a free time channel both on the line LREI*i* and on the line LRSI*j* of an intermediate time switch, the logic BLDC causes the number of the time switch being tested to progress through the order to advance the ACI register until this register contains the number 31, corresponding to the address of the intermediate time switch CI32. If the time switch CI32 does not have a free time channel both on the line LREI*i* and on the line LRSI*j*, the path test stops: no path is possible and communication cannot be established; the calling subscriber will receive the busy signal.

A more detailed operation of the path test is described below and the sequential command circuit CCS causes the following operations to be performed (FIGS. 4–7):

Order to set the ACI register at "0" (wire 21, FIG. 5);

Transfer of the number of ACS*j* into ACS/ACE (wire 2, FIG. 5);

Order to set the register LRS/LRE at "1" depending upon whether we have transferred to it the number of ACS or of ACE (wire 22, FIG. 5);

Order to read the word in the central memory thus designated (wire 13, CL, FIG. 6);

The reading result, being placed in the RLE register, after the test of the first free bit, orders the transfer of the output of the decimal-binary coding network CDB (FIG. 7) into the RVT register (wire 18, FIG. 7); on the other hand, if there is no free bit location, it orders the advance of the counter ACI (wire 7, FIG. 5) and then once again orders the reading of the memory word designated (wire 13, FIG. 6);

For a free time channel on LRSI;, the sequential command circuit CCS orders, through the wire 17, the transfer of register RVT (FIG. 7) to the registers VT*m* of the transmission register RCI (FIG. 4*b*); this transfer is made with the help of wire 6;

We then transfer the number of ACE*i* from the register RRI (FIG. 4*a*) into the register ACS/ACE of the FIG. 5 through the reference wire 3 and we position at "0" the flip-flop LRE/LRS in order to test the free time channel on the network line LREIi;

The sequential command circuit CCS then orders the reading of the central memory word designated by the new address and if a bit location of this word is at "0", that is to say, if a time channel is free, there is a command for the transfer of the output of the decimal-binary coder CDB into the register RVT (FIG. 7), followed by the transfer of the VRT register into the VT*l* register of the transmission register (FIG. 4*b*) in a manner similar to what we saw for VT*m;*

Finally, there is a transfer of the ACI register (FIG. 5), through the reference wire 5, into the ACI transmission register (FIG. 4*b*).

No free time channel: If time channel is found to be free, the sequential circuit CCS orders the advance of the ACI counter (FIG. 5) through the reference wire 7 and the operations begin all over again with the new content of the ACI register, that is to say, for the following intermediate time switch. The orders are then resumed, order for the transfer of ACS*j* into ACS/ACE, etc.

One free time channel on LRSI*j* and on LREI*i:* In the case where a time channel was found to be free both on LRSI*j* and on LREI*i*, the sequentiaL command circuit CCS orders the following:

The transfer of VT*l* from the transmission register (FIG. 4*b*) into the RVT register through the reference wire 6*a*, the setting, at "0" of the flip-flop LRS/LRE (FIG. 5), and the transfer of the ACE*i* number from the reception register RRI (FIG. 4*a*) into the ACS/ACE register (FIG. 5).

The reading of the central occupation memory word designated by the address ACI (which had already been positioned by the address ACEi and LRE);

The setting, at "1", of the bit location designated by the RVT register and the associated decoder DBD, in the reading/writing register RLE;

The entry, in the central memory, at the same address, of the new content of the reading/writing register;

The transfer of the ACS*j* register from the reception register RRI (FIG. 4*a*) into the register ACE/ACE (FIG. 5);

The setting of the trigger pair LRS/LRE at "1";

The reading of the word of the central occupation memory MCO designated by this new address;

The transfer, into RVT (FIG. 7), of the VT*m* register from the transmission register through the reference wire 6*a;*

The order for setting at "1 "in the reading/writing register, the bit location designated by the RVT register and the associated decoder DBD;

The order for setting at "1", in the reading/writing register, the bit location designated by the RVT register and the associated decoder DBD;

The entry, in the central memory, at the same address, of the new content of the reading/writing register.

The sequential command circuit CCS then orders the transfer, to the central computer, through the wire ECC (FIG. 4*b*), of the information contained in the transmission register RCI, in other words, the positive path test function, that is to say:

Number of VT*l* on LREI*i;*

Number of VT*m* on LRSI*j;*

The central computer already has the numbers of the selector switches ACS*j* and ACE*i*, that is to say, the numbers of LRSI*j* and LREI*i*.

If this test is negative, the function transferred indicates that there is no channel available and the content of the register is zero (ACI, VT*l*, and VT*m*).

Operation during path release.

Another case of operation will be described below for the case involving the release of a path. After reception, by the BLDC block, of the path release function FO, the reception register RRI (FIG. 4*a*) receives the information necessary for execution, that is to say:

The ACI address of the intermediate time switch;

The ACS*j* and ACE*i* addresses of time switches having the network lines LRSI*j* and LREI*i* coupled to ACI;

The time channel numbers VT*l* and VT*m* of the time channels to be released on LREI*i* and LRSI*j*.

Path release consists —after having erased the words from the command memories MCS, MCI, and MCE — in erasing the occupied status from the bit location corresponding to the released channels in the central memory MCO. The words in the command memories are released without the intervention of the decision and command logic block BLDC; on the other hand, the BLDC does intervene for the release of the memory MCO.

The overall operation takes place as follows (FIGS. 1 and 3):

The logic block BLDC transfers the number of CI*k*, that is to say, the number *k*, into the ACI portion of the address register, then the number *j* into the portion ACS, it sets the LRE/LRS stage at "1" in order to release the LRSI*j* and it transfers the number *m* (number of VT*m*) into the RVT register;

The logic block BLDC first of all orders the reading of the word designated in the MCO, then the erasing (setting at "0" of the binary element designated by *m*), and finally the re-writing of the new content of the word read;

The logic block BLDC then proceeds to the release of VT*l* in the line LREI*i* of CI*k* and, for this purpose, without changing the content of ACI, transfers the number *i* into ACE, sets the LRE/LRS stage to "0" and transfers the number *l* (number of VT*l*) into RVT;

The logic block BLDC then orders the reading of the designated word in MCO, then the erasing of the bit location designated by *l* and finally the re-writing of the new content of the word read.

The more detailed operation of path release is given below and the sequential command circuit CCS causes the following operations to be performed (FIGS. 4–7):

Release of the time channel VT*l* of the LREI*i* of the intermediate time switch CI*k*:

Transfer of the content of ACI from the reception register RRI (FIG. 4*a*) into the ACI register (FIG. 5) through the reference wires 1;

Transfer of ACE*i* from the reception register RRI (FIG. 4*a*) into the register ACE/ACS (FIG. 5) through reference wires 3;

Transfer of VT*l* from the reception register RRI (FIG. 4*a*) into the register RVT of FIG. 7 through the reference wires 4;

Setting the flip-flop LRS/LRE at zero by means of the reference wire 22;

Order to read the word of the central occupation memory MCO designated by the address in the registers and consecutive transfer of this information into the reading/writing register RLE (reference wire 13, FIG. 6, and transfer, FIG. 7);

Order to set at "0" the stage of the reading register RLE designated by the register RVT and the associated decoder DBD (FIG. 7) by the reference wire 19;

Order to enter, in the central memory MCO, at the same address, of the new content of the RLE register; the order is given through the reference wire 14 (FIG. 6) and the transfer of RLE into MCO is performed with the help of wires IE and RLE (FIG. 7);

Release of the time channel VT*m* of the LRSI*j* of the intermediate time switch CI*k*:

This is accomplished through operations similar to the release of VT*l*;

Transfer of ACS*j* into the ACS/ACE register (FIG. 5) through the reference wire 2;

Transfer of VT*j* from the reception register RRI (FIG. 4*a*) into the RVT register of FIG. 7 by means of reference wire 4;

Setting the flip-flop LRS/LRE at "1" (FIG. 5);

Order to read the word in the central occupation memory MCO designated by the address in the registers and consecutive transfer of this information into the RLE reading/writing register (reference wire 13, FIG. 6, and transfer, FIG. 7);

Order to set at "0" the stage of the reading register RLE designated by the RVT register and the associated decoder DBD (FIG. 7), that is to say, the stage corresponding to temporary channel VT*m*;

Order to enter, in the central memory MCO, at the same address, the new content of the RLE register; the order is given through the reference wire 14 (FIG. 6) and the transfer of RLE into MCO is performed with the help of wires IE of RLE (FIG. 7);

This group of operations completes the release of a path either from the party calling to the party called or from the party called toward the party calling.

While the invention has been particularly shown and described with reference to a preferred embodiment thereof, it will be understood by those skilled in the art that various changes in form and details may be made therein without departing from the spirit and scope of the invention. What is claimed is:

1. A path testing device for a time division switching system including a central computer and a time division switching network with stages made up of an input stage, an intermediate stage, and an output stage, said input stage including *n* input time switches with *n* inputs and at most 2*n*–1 outputs, said intermediate stage including at most 2*n*–1 intermediate time switches with *n* inputs and *n* outputs, and said output stage including *n* output time switches having at most 2*n*–1 inputs and *n* outputs, each input time switch and each output time switch being linked by an intermediate network line to all of the intermediate time switches, each time switch having a similar internal structure which includes a buffer memory and a command memory, said path testing device comprising: a central occupation state memory containing a number of words corresponding to the total number of intermediate network lines, each word containing as many bits as there are time channels in an intermediate network line;

decision and command logic control means, permanently connected to said computer for sequentially arranging and commanding the various elements of said device;

selection switches address register means, responsive to said decision and command logic control means, for selectively storing the addresses of input, intermediate and output time switches;

address decoder means, coupled to said selection switches address register means, for accessing said central occupation state memory;

a reading/writing register, coupled to said central memory, for selectively reading or writing a memory word out of or into said central memory;

a free time channel selection circuit coupled to the output of said reading/writing register;

a time channel number register for storing the number of the time channel to be entered or erased in said central occupation state memory;

a decimal/binary decoder coupled between said time channel selection circuit and the input of said time channel register; and a binary/decimal decoder coupled between the output of the time channel register and said central occupation state memory;

wherein the elements of the path testing device are so interconnected as to enable the device to conduct a path test prior to the establishment of a communication between an input time switch and an output time switch, but also for a path release at the end of a communication, said device including said central occupation state memory containing at any movement the occupation state of the intermediate network lines and their time channels for the entire time division switching network.

2. A device according to claim 1 wherein said decision and command logic control means includes;

an information reception register coupled to said central computer for receiving information from said computer, an information transmission register coupled to said central computer for transmitting information to said central computer, and a sequential command circuit for translating and supervising the execution of commands from said central computer to the different elements of the said device and for transmitting to said central computer the occupation states of said device.

3. A device according to claim 1 wherein said reading/writing register comprises 32 flip-flops and 32 OR gates, the input of each of said flip-flops being coupled to a different output of a different one of said OR gates, said OR gates including two inputs each, one input of each of said OR gates being coupled to said central memory, the other input of each of said OR gates being coupled to said binary/decimal decoder coupled to the output of said time channel register, the outputs of said reading/writing register being coupled to the inputs of said selection circuit and to said central memory such that in a path test said selection circuit selects a free time channel and its designation as such consecutively entered into the central memory.

4. A device according to claim 3 wherein said address register means includes an intermediate time switch address register, an input/output time switch address register, and a register for storing an indication of whether an input network line time channel or an output network line time channel is being selected, a first binary/decimal decoder coupled to said intermediate time switch address register and a second binary/decimal decoder coupled to said input/output time switch address register.

5. A device according to claim 4 wherein each word stored within said central memory is a 32 bit word, and said central memory has associated therewith a three input AND gate, a first input of each of said AND gates being coupled to said first binary/decimal decoder, a second input of each of said AND gates being coupled to said second binary/decimal decoder and the third input of each of said AND gates being coupled to said register corresponding to the time channel being selected, wherein the energization of the three inputs of an AND gate determines a particular single word in said memory.

6. A device according to claim 5 wherein said selection circuit includes 32 inputs coupled to 32 outputs of said reading/writing register and 32 outputs corresponding to the 32 time channels of a network line for indicating the existence of a free time channel and further including a 33 output line for indicating that there are no free channels, said selection circuit comprising 31 AND gates and 32 inverters, said AND gates and inverters being coupled in cascade.

7. In a path testing device for a time division switching system including a central computer and a time division switching network with stages made up of an input stage, an intermediate stage, and an output stage, said input stage including $n$ input time switches with n inputs and most $2n-1$ outputs, said intermediate stage including at most $2n-1$ intermediate time switches with $n$ inputs and $n$ outputs, said output stage including $n$ output time switches having at most $2n-1$ inputs and $n$ outputs, each input time switch and each output time switch being linked by an intermediate network line to all of the intermediate time switches, each time switch having a similar internal structure which includes a buffer memory and a command memory, said path test device comprising a central occupation state memory containing a number of words corresponding to the total number of intermediate network lines, each word containing as many bits as there are time channels in an intermediate network line;

decision and command logic control means, permanently connected to said computer for sequentially arranging and commanding the various elements of said device;

selection switches address register means, responsive to said decision and command logic control means, for selectively storing the addresses of input, intermediate and output time switches;

address decoder means, coupled to said selection switches address register means for accessing said central occupation state memory;

a reading/writing register, coupled to said central memory, for selectively reading or writing a memory word out of or into said central memory;

a free time channel selection circuit coupled to the output of said reading/writing register;

a time channel number register for storing the number of the time channel to be entered or erased in said central occupation stage memory;

a decimal/binary decoder coupled between said time channel selection circuit and the input of said time channel register; and a binary/decimal decoder coupled between the output of the time channel register and said central occupation state memory;

a method for testing for and selecting a path between an input and an output of said intermediate stage, in response to a path test command giving the number of one incoming intermediate network line and the number of one outgoing intermediate network line, comprising the steps of:

determining an intermediate time switch having a free time channel on an incoming intermediate network line;

storing the number of said intermediate time switch;

determining the existence of a free time channel on said outgoing intermediate network line; and writing in said central memory at the location corresponding to the selected incoming and outgoing time channels of each intermediate network line an indication that they are no longer free, said step of writing being carried out prior to the informing of said central computer that a positive path test has been accomplished.

8. A method according to claim 7, further including a series of steps for releasing a path through said intermediate stage, in response to a path release command, comprising the steps of:

reading the location in the central memory corresponding to the intermediate outgoing network line time channel which is to be released;

transferring the contents of that memory location into said time channel register;

erasing the contents of said memory location, so as to indicate the free status of the time channel;

rewriting a new word indicating the free status of said channel into the memory at the location corresponding to the time channel which has been freed;

reading the storage location corresponding to the intermediate input network line time channel;

transferring the contents of said memory location into said time channel register;

erasing the contents of said memory location, so as to indicate the free status of said intermediate input network time channel; and writing a new word indicating the free status of the time channel into the memory location of the central memory corresponding to the time channel of the intermediate input network line.

* * * * *